Aug. 14, 1951  H. D. HUNTSBERGER  2,563,936
METHOD OF MANUFACTURING BATTERY GRIDS
Filed Feb. 6, 1948

INVENTOR.
HERBERT D. HUNTSBERGER
BY
Kwis, Hudson, Boughton & Williams
ATTORNEYS

Patented Aug. 14, 1951

2,563,936

UNITED STATES PATENT OFFICE 2,563,936

METHOD OF MANUFACTURING BATTERY GRIDS

Herbert D. Huntsberger, Cleveland Heights, Ohio, assignor to Willard Storage Battery Company, Cleveland, Ohio, a corporation of West Virginia Application February 6, 1948, Serial No. 6,793

6 Claims. (Cl. 136—19)

The present invention relates to the manufacture of secondary or storage batteries and, more particularly, to the manufacture of pasted grid type plates for storage batteries of the lead-acid type.

During the application of the paste to the grids in the manufacture of battery plates of the paste grid type, some of the paste adheres to the outside edges of the grids irrespective of whether the pasting is performed by hand or by machine, which paste is subsequently removed, usually by hand. The operation of removing this excess paste from the outside edges of the grids is quite tedious and expensive because after the plates are set, the paste adheres tightly to the grids and when the plates are wet, it is difficult to handle them without damage.

With the foregoing in mind, one of the principal objects of the present invention is the provision of a novel and improved method of manufacturing battery plates of the pasted grid type which comprises treating or coating the outside edges of the grids prior to pasting so that paste will not strongly adhere thereto, if at all, and any paste thereon can be easily removed although allowed to set thereon.

A more specific object of the invention is the provision of a novel and improved method of manufacturing battery plates of the character referred to which comprises coating the outside edges of the grids with wax or wax-like material including paraffin and the like prior to pasting and thus preventing paste from adhering to the edges of the grids and facilitating the removal of any which may adhere to the coating during the pasting operation.

Figure 1:
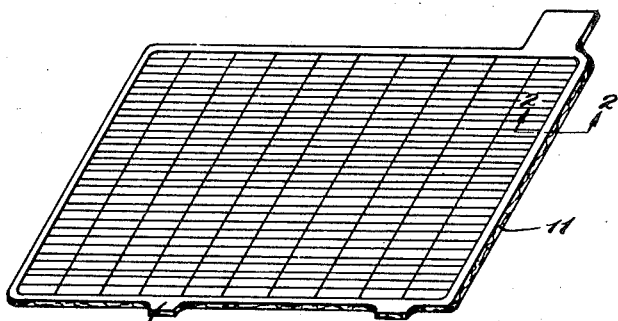
Figure 2:
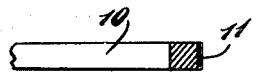
Figure 3:
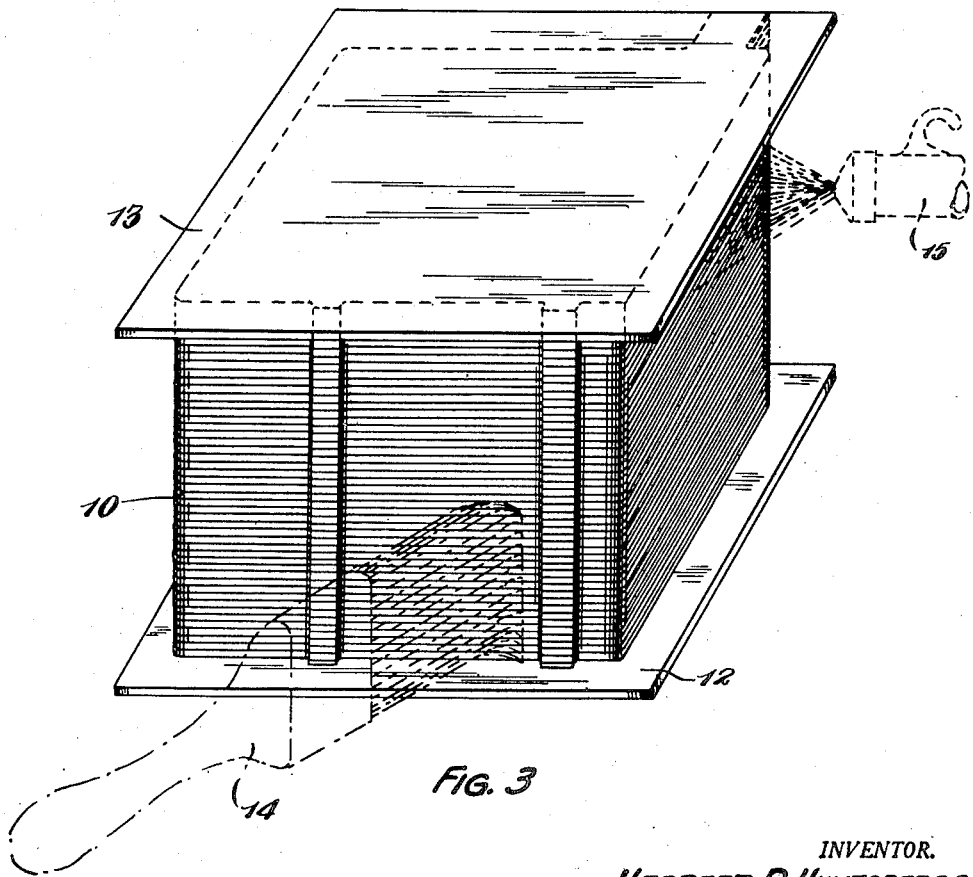

Further objects of the invention will be apparent to those skilled in the art to which it relates from the following detailed disclosure of the invention made with reference to the accompanying drawings forming a part of this specification and in which Fig. 1 is a perspective view of a storage battery plate grid treated according to the present invention and ready for pasting;

Fig. 2 is an enlarged fragmentary sectional view approximately on the line 2—2 of Fig. 1; and Fig. 3 is a perspective view illustrating the proposed methods of applying the coating shown in Figs. 1 and 2 to the edges of a plurality of grids.

As previously stated, during the manufacture of battery plates of the pasted grid type, some of the paste is applied to and adheres to the outside edges of the grids during the pasting operation, which excess paste is subsequently removed, usually by hand. The excess paste cannot readily be removed from the edges of the plates prior to setting because it is difficult to handle the plates while the paste is wet without damage to the plates. After the paste has set, it adheres strongly to the grid and removal thereof is difficult and expensive. This difficulty is overcome according to the provisions of the present invention by coating the outside edges of the grids prior to pasting with a material inert to the grid and the electrolyte of the battery and such that it will prevent the paste from adhering to the grid even though allowed to set thereon. Any wax, such as paraffin, carnauba, candilila, beeswax, etc., may be used. These materials can best be applied as a water wax emulsion similar to commercial self-polishing floor waxes, which also will serve. The emulsifying ingredients or methods are of no significance, except that such wax emulsions serve as an easy, convenient means of application. The wax concentration is of little importance, as a very thin residual wax film is all that is needed. Similar waxes dissolved in low concentration in a suitable solvent may be used but are more expensive and in some instances may possibly involve health and fire hazards.

Referring to the drawing, the reference character 10 designates a cast lead antimony grid of the character commonly employed in commercial storage batteries, the side edges of which were coated with a wax preferably applied as a water wax emulsion, such as, Johnson's Industrial Wax No. 1515–AX manufactured by S. C. Johnson's & Son, Inc., which was then allowed to dry. Upon drying there remained a wax coating 11 around the peripheral edges of the grid. The grid is ready for pasting and the coating is such that any paste contacting the edge or coated portions of the grid will not strongly adhere thereto, if at all, even though the paste is allowed to set in place. Subsequently to pasting and setting, any paste adhering to the coated edges of the grid can be easily removed by hand or machinery; for example, by brushing lightly with a suitable brush. The excess paste brushes off cleanly with very little effort and most, if not all, of the wax is absorbed therein so that no further cleaning is necessary to remove the original wax coating.

The invention is not limited to the use of the coating materials suggested above but any suitable material may be employed; for example, paraffin, which can easily be applied while hot. If a coating material is employed which adheres permanently to the plates in addition to being inert to the electrolyte of the battery, etc., it should be of such a character that the paste will not adhere strongly to it, thereby providing for easy removal of the paste. The coating material may be applied in any convenient manner as by a paint brush or spraying.

A convenient way of applying the coating material to the edges of the grid is shown in Fig. 3 where a plurality of grids 10 are stacked upon a table top 12, a suitable paper, metal or wooden shield 13 placed upon the top of the stack and the coating material applied to the edges of a plurality of the grids simultaneously either with a paint brush or by spraying, such as the brush 14 or spray gun 15 shown in dot-dash lines. Preferably a small amount of colored dye is applied to the coating material so that the amount of coating material applied can be more easily regulated visually.

From the foregoing, it will be apparent that the objects of the invention heretofore enumerated and others have been accomplished and that there has been provided a method of manufacturing battery plates of the pasted grid type which prevents paste from strongly adhering to the edges of the grids even though set, thus facilitating the removal of any paste adhering thereto and in turn reducing the manufacturing cost.

Having thus described my invention, I claim:

1. The method of manufacturing storage battery plates of the pasted grid type which comprises providing a lead alloy plate grid, covering the outside edges of the grid with material which will prevent the paste from adhering to the grid, pasting the grid with paste which normally strongly adheres to the lead alloy of the plate grid, allowing the paste to set or dry, and subsequently removing from the grid any paste adhering to the covering material.

2. The method of manufacturing storage battery plates of the pasted grid type which comprises providing a lead alloy plate grid, coating the edges of the grid with wax to which the paste will not strongly adhere when set, pasting the grid with paste which normally strongly adheres to the lead alloy of the plate grid, allowing the paste to set or dry, and subsequently removing any excess paste adhering to the coating.

3. The method of manufacturing storage battery plates of the pasted grid type which comprises providing a lead alloy plate grid, coating the edges of the grid with paraffin, pasting the grid with paste which normally strongly adheres to the lead alloy of the plate grid, allowing the paste to set or dry, and subsequently removing any excess paste adhering to the paraffin.

4. The method of manufacturing storage battery plates of the pasted grid type which comprises providing a lead alloy plate grid, covering the outside edges of the grid with a coating of material which will not strongly adhere to the lead alloy of the grid but to which the paste will strongly adhere, pasting the grid with paste which normally strongly adheres to the lead alloy of the plate grid, allowing the paste to dry or set, and subsequently removing said coating and any excess paste adhering thereto.

5. The method of manufacturing storage battery plates of the pasted grid type which comprises providing a lead alloy plate grid, covering the outside edges of the grid with a material inert to the electrolyte of the battery but to which the paste will not strongly adhere, pasting the grid with paste which normally strongly adheres to the lead alloy of the plate grid, allowing the paste to dry, and subsequently removing any excess paste adhering to said material.

6. The method of manufacturing storage battery plates of the pasted grid type which comprises providing a lead alloy plate grid, applying a wax emulsion to the outside edges of the grid, pasting the grid with paste which normally strongly adheres to the lead alloy of the plate grid, allowing the paste to dry, and subsequently brushing paste from the portions of the grid having the wax applied thereto.

HERBERT D. HUNTSBERGER.

REFERENCES CITED

The following references are of record in the file of this patent:

UNITED STATES PATENTS

| Number | Name | Date |
|---|---|---|
| 518,966 | Phillips et al. | May 1, 1894 |
| 919,010 | Heim | Apr. 20, 1909 |
| 1,105,243 | Blondel el al. | July 28, 1914 |
| 1,197,737 | Hayden | Sept. 12, 1916 |
| 1,638,943 | Little | Aug. 16, 1927 |
| 1,747,661 | Carter | Feb. 18, 1930 |
| 2,115,127 | Smith | Apr. 26, 1938 |
| 2,365,705 | Jeri | Dec. 26, 1944 |

FOREIGN PATENTS

| Number | Country | Date |
|---|---|---|
| 1,890 | Great Britain | of 1901 |